United States Patent
Feldman et al.

(10) Patent No.: US 12,547,393 B2
(45) Date of Patent: Feb. 10, 2026

(54) SYSTEM AND METHOD FOR RELIABLE OVER-THE-AIR FIRMWARE UPDATES

(71) Applicants: Siemens Industry, Inc., Alpharetta, GA (US); Siemens Aktiengesellschaft, Munich (DE)

(72) Inventors: Daniel Feldman, New York, NY (US); Christopher Mullis, Smynra, GA (US); Christian Feininger, Schwabach (DE)

(73) Assignee: Siemens Aktiengesellschaft, Munich (DE)

( * ) Notice: Subject to any disclaimer, the term of this patent is extended or adjusted under 35 U.S.C. 154(b) by 212 days.

(21) Appl. No.: 18/356,816

(22) Filed: Jul. 21, 2023

(65) Prior Publication Data

US 2025/0028517 A1   Jan. 23, 2025

(51) Int. Cl.
*G06F 8/65* (2018.01)

(52) U.S. Cl.
CPC ................................. *G06F 8/65* (2013.01)

(58) Field of Classification Search
USPC ......................................................... 717/171
See application file for complete search history.

(56) References Cited

U.S. PATENT DOCUMENTS

| | | | |
|---|---|---|---|
| 10,789,057 B2 | 9/2020 | Vichare et al. | |
| 10,831,463 B2* | 11/2020 | Liu | G06F 11/1471 |
| 2014/0196024 A1* | 7/2014 | Hanon | G06F 8/654 |
| | | | 717/178 |
| 2019/0042228 A1* | 2/2019 | Nolan | G06F 8/64 |
| 2019/0108465 A1* | 4/2019 | Zhou | G06Q 10/06375 |
| 2020/0034133 A1* | 1/2020 | Dattatri | G06F 8/61 |
| 2021/0004222 A1* | 1/2021 | Huang | H04L 65/80 |
| 2021/0208867 A1 | 7/2021 | Brodde | |
| 2024/0256264 A1* | 8/2024 | Gage | H04L 67/55 |

FOREIGN PATENT DOCUMENTS

GB   2577953 A   4/2020

OTHER PUBLICATIONS

"Car Charging Gets Smart with Nordic Cellular IoT and Bluetooth LEpowered Portable EV Charger"; NordicSemi.com webpage [full URL included in ref.]; Feb. 28, 2023 (Year: 2023).*

* cited by examiner

*Primary Examiner* — Yuqing Xiao
*Assistant Examiner* — Clint Thatcher (57) ABSTRACT

A system for over-the-air (OTA) firmware update includes an industrial device with firmware, a central server with an interface configured to collect and process data from a data source, a wireless network, wherein the at least one industrial device and the central server are configured to communicate via the wireless network, and an OTA prediction module, the OTA prediction module being configured via executable instructions to determine a probability rate for a successful OTA firmware update of the industrial device based on the data received from the data source, and deploy the OTA firmware update to the industrial device when the probability rate is equal to or above a predetermined threshold.

9 Claims, 4 Drawing Sheets

SYSTEM AND METHOD FOR RELIABLE OVER-THE-AIR FIRMWARE UPDATES

BACKGROUND

1. Field

Aspects of the present disclosure generally relate to deploying firmware and/or software updates or installations. More specifically, various embodiments relate to reliable over-the-air deployment of firmware and/or software updates. The phrase 'over-the-air' is herein also referred to as 'OTA'.

2. Description of the Related Art

Many industrial devices, such as for example modules of electric vehicle charging (EVC) equipment, programmable logic controllers (PLCs), human-machine-interface (HMI) devices, drives, switches etc., typically comprise (micro-) controllers or integrated circuits of various kinds, generally processor circuitries, and corresponding firmware for executing specific applications. Firmware is a specific class of software that provides control for the device's specific hardware and is stored in non-volatile memories.

Firmware of industrial devices, or generally devices that comprise firmware, such as embedded systems, need to be updated from time to time because for example applications or programs executed by the firmware have been improved or modified. Another reason to update firmware is for security purposes, for example to address reported security weakness or issues.

An OTA update, also known as over-the-air programming or OTA programming, is an update to an embedded system that is delivered through a wireless network, such as Wi-Fi or cellular network. Various components may be updated via OTA, including a device's operating system, applications, configuration settings, or parameters like encryption keys.

OTA firmware or software updates can be disrupted by issues with the electrical grid at the location in which the target device is placed. If an OTA update is interrupted during execution, as a minimum data is wasted in a communications plan, wasting power as well as potentially exhausting a data plan. In a worst case, an OTA update that is interrupted at a wrong time could cause damage to hardware in a hard to recover way, causing loss of productivity. Thus, there may exist a need for an improved system and method for reliably updating firmware over-the-air.

SUMMARY

Various embodiments relate to reliable OTA deployment and execution of firmware and/or software updates.

A first aspect of the present disclosure provides a system for an over-the-air (OTA) firmware update comprising at least one industrial device comprising firmware, a central server comprising at least one interface configured to collect and process data from a data source, a wireless network, wherein the at least one industrial device and the central server are configured to communicate via the wireless network, and an OTA prediction module with at least one processor and a memory, the OTA prediction module being configured via executable instructions to determine a probability rate for a successful OTA firmware update of the at least one industrial device based on the data received from the data source, and deploy the OTA firmware update to the at least one industrial device when the probability rate is equal to or above a predetermined threshold.

A second aspect of the present disclosure provides a method for an over-the-air (OTA) firmware update comprising collecting data from a data source, determining a probability rate for an OTA firmware update of at least one industrial device based on the data, and deploying the OTA firmware update to the at least one industrial device when the probability rate is equal to or above a predetermined threshold.

A third aspect of the present disclosure provides a non-transitory computer readable medium encoded with processor executable instructions that when executed by at least one processor, cause the at least one processor to carry out a method for an OTA firmware update as described herein.

DETAILED DESCRIPTION

To facilitate an understanding of embodiments, principles, and features of the present disclosure, they are explained hereinafter with reference to implementation in illustrative embodiments. In particular, they are described in the context of being systems and methods for reliable OTA firmware or software updates or installations on different devices or systems, for example on electric vehicle charging devices. Embodiments of the present disclosure, however, are not limited to use in the described systems, devices, or methods.

Figure 1:
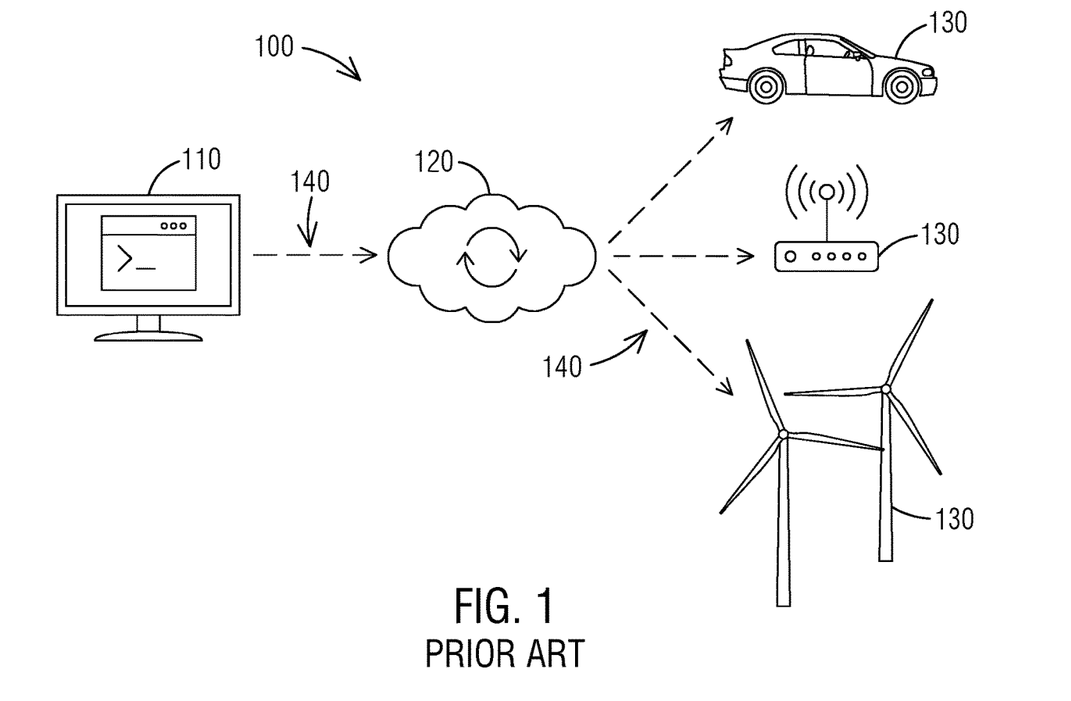
FIG. 1 illustrates a diagram of known OTA firmware updates in accordance with embodiments of the present disclosure.

FIG. 1 illustrates a diagram of a known system 100 for OTA firmware updates in accordance with embodiments of the present disclosure. As noted, an OTA firmware update is an update to an embedded system that is delivered through a wireless network, such as Wi-Fi or cellular network. Various components may be updated over-the-air, including a device's operating system, applications, configuration settings, or parameters like encryption keys.

The generic example system 100 illustrates a device management system 110, which is for example operated by a manufacturer, that issues a new firmware update or software update. The update is uploaded to the cloud 120 via a connection 140. In general, the cloud 120 refers to servers that are accessed over the Internet, and the software and databases that run those servers. Cloud servers are in data centers all over the world. Cloud computing enables users/organizations to access and store information without managing their own physical devices or IT infrastructure.

The update is queued, downloaded, and verified by a target device 130 over a mobile connection 140, for example cellular connection. Target devices 130 include for example vehicles, electric/electronic devices or systems, industrial facilities, etc. The mobile connections 140 are secure connections that are encrypted by one or more security protocols to ensure security of the data flowing between the different systems.

Figure 2:
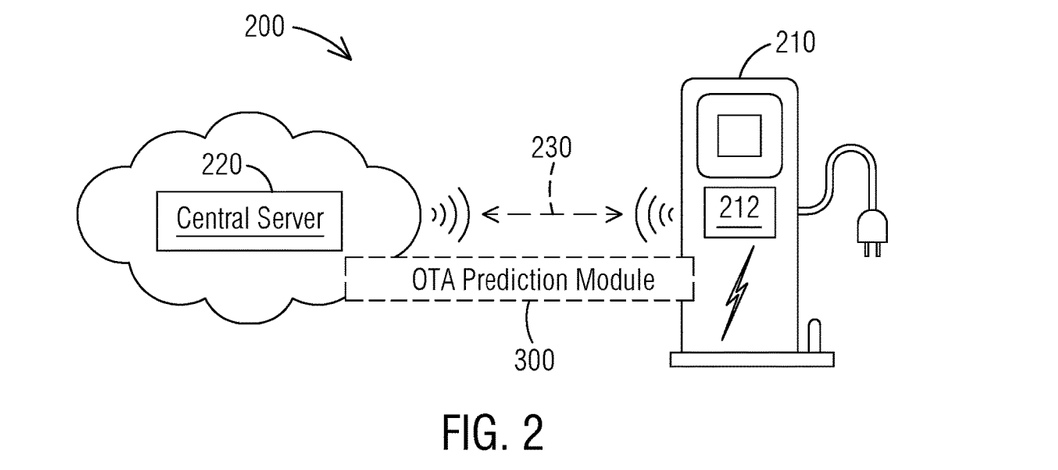
FIG. 2 illustrates a diagram of a system for a reliable OTA firmware update in accordance with an exemplary embodiment of the present disclosure.

FIG. 2 illustrates a diagram of a system 200 for a reliable OTA firmware update in accordance with an exemplary embodiment of the present disclosure.

In general, the system 200 has an ability to collect information from multiple input sources and provide outputs, e. g. make decisions, predictions and/or determinations, such as determine a probability rate for a successful OTA update and deploy the OTA update in case of a positive probability rate. In other words, OTA firmware/software updates are executed taking into consideration a likelihood that the update will succeed.

More specifically, the system 200 comprises at least one industrial device 210 comprising firmware, a central server 220 comprising at least one interface configured to collect and process data from a data source, and a wireless network 230, wherein the at least one industrial device 210 and the central server 220 are configured to communicate via the wireless network 230.

The at least one industrial device 210, i.e., target device, can be for example an electric charging device, such as an electric vehicle charging station or an electric charging wall. The mobile connections 230 are secure connections that are encrypted by one or more security protocols to ensure security of the data flowing between the different systems.

The central server 220 can be configured as a cloud server. In other examples, the central server 220 may not be a cloud server but a type of computer or server, such as a local server or remote server, a back-office server platform, a cluster controller platform, configured to perform the functions as described herein.

In another exemplary embodiment, the central server 220 may be a computing platform, such as a distributed platform with components in different locations, e.g., a combination of cloud server and target device controller.

The system 200 further comprises an OTA prediction module 300 configured via executable instructions to determine a probability rate for a successful OTA firmware update of the at least one industrial device 210 based on the data received from the data source and deploy the OTA firmware update to the at least one industrial device 210 when the probability rate is equal to or above a predetermined threshold. The OTA prediction module 300 will be described in more detail in connection with FIG. 3.

In an embodiment, the central server 220 comprises the OTA prediction module 300, i.e., the algorithm performed by the OTA prediction module 300 is centralized, with the server 220 deciding when it would be the best time for the at least one industrial device 210 to perform an update. In another embodiment, the OTA prediction module 300 and associated algorithm can be performed in a distributed manner, for example distributed on the central sever 220 and the at least one industrial device 210. In this case, a training of the OTA prediction module 300 is done centrally, via server 220, but inference for the decision about when to attempt to initiate the OTA firmware update is done locally by the industrial device 210, based on the same data. While this variant may be more data heavy than a centralized algorithm, on the other hand it is lighter from the central processing power required, and thus may be easier to scale.

As illustrated in FIG. 2, the central server 220 and the at least one industrial device 210 are configured to communicate with each other, i.e., exchange data, signals, and instructions. Thus, the at least one industrial device 210 may comprise a controller 212 or some type of control device that is configured to interact and exchange data and information with the central server 220.

Figure 3:
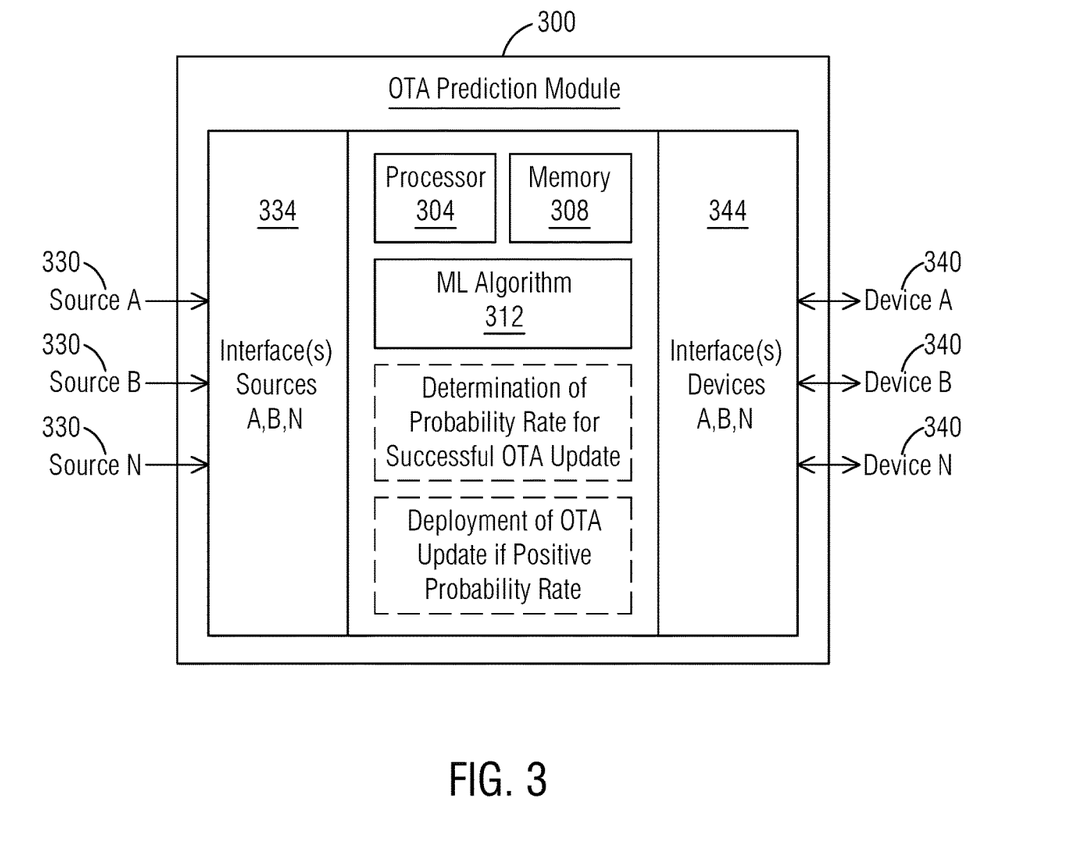
FIG. 3 illustrates a diagram of an OTA prediction module of a system for a reliable OTA update in accordance with an exemplary embodiment of the present disclosure.

FIG. 3 illustrates a diagram of an OTA prediction module 300 in accordance with an exemplary embodiment of the present disclosure. In an example, the OTA prediction module 300 is part of a system 200 as illustrated in FIG. 2 and can be a component of central server 220 and/or the at least one industrial device 210.

More specifically, the OTA prediction module 300 is operably coupled to or comprises one or more processor(s) 304 and memory(s) 308. In exemplary embodiments, the memory 308 may include any of a wide variety of memory devices including volatile and non-volatile memory devices, and the at least one processor 304 may include one or more processing units.

The OTA prediction module 300 may be embodied as software or a combination of software and hardware. The OTA prediction module 300 may be a separate module or may be an existing module programmed to perform a method as described herein. For example, the OTA prediction module 300 may be incorporated, for example programmed, into an existing system or platform, by means of software.

In an exemplary embodiment of the present disclosure, the OTA prediction module 300 further comprises an algorithm, specifically a machine learning (ML) algorithm 312 which, in combination with the processor 304 and memory 308, executes a method for a reliable OTA firmware update. The OTA prediction module 300, i.e., algorithm 312, is configured to perform different calculations, determinations, predictions and/or decisions, based on inputs from multiple input sources 330, e. g. source A, source B, source N. It should be noted that there may be more input sources 330 than illustrated. The OTA prediction module 300 is configured to use any number of input sources 330, depending for example on availability or usefulness of sources.

The data sources 330 are digital data sources, wherein each data source comprises a plurality of data and information relating to different aspects or topics. The data sources include for example websites or online sites that are freely available or may include sources provided by other parties.

Further, the OTA prediction module 300 is configured to deploy and execute a firmware/software update if a positive probability rate is determined. The update is deployed to and executed by a target device 340, such as target devices A, B, N, via one or more interface(s) 344, such as client-server interface(s). The target devices 340 can be industrial devices, such as electric charging device including an electric vehicle charging station or an electric charging wall. It should be noted that there may be more target devices 340 than illustrated in FIG. 3, that are in communication with the central server 220 and receive updates.

The system 300 comprises one or more interface(s) 334, generally configured to provide, for example to collect, obtain or receive, data from the plurality of data sources A, B, N. An example for an interface is a computing interface or software implemented interface which defines interactions between multiple software intermediaries. An example for a computing interface is an application programming interface (API), wherein the API interacts with separate software components or resources for providing, e.g., transferring or exchanging, data in an automated manner from the data sources 330 to the target application (OTA prediction module 300).

The different data sources 330 provide at least information as described below.

a) Weather: The central server 220 stores a geographic location for the target devices 340 to which the firmware update is to be deployed. Weather information of the geographic location of the target devices 340 is collected and processed. Bad (unfavorable) weather, such as a thunderstorm, snowstorm, etc. at the target device location is considered, because bad weather could cause power failures on the local grid. This means that bad weather conditions do not contribute to a positive probability rate for a successful firmware update of the target device.

b) Natural disasters: Natural disasters, such as earthquakes, avalanches, etc. at the device location are considered, because they may increase the probability of an upcoming power failure.

c) Local temperature: The local temperature of the target device 340 is collected. A local temperature that is close to a (predefined) maximum or minimum allowed temperature for a firmware/software update of the target device 340 does not contribute to a successful OTA update.

d) Electric grid fluctuations: Electric grid fluctuations relating to the target device 340 are monitored and corresponding data collected. Grid fluctuations of, for example, more than +/−5% per measurement period are unfavorable for a successful OTA update. A measurement period can be for example every 10 seconds, or similar.

e) Network connectivity: Network connectivity relating to the target device 340 is monitored and corresponding data collected. The network connectivity is set to a minimally accepted connectivity rate to ensure a data transfer without packet loss. Network connectivity below the minimally accepted limit is considered unfavorable.

f) Maintenance activity: Scheduled maintenance activity of the target device 340 and/or the central server 220 is monitored. A scheduled maintenance activity may result in power loss of the device 340 or associated building or other local infrastructure, e.g., planned rolling brownouts.

g) Local sabotage: Local sabotage on the target device 340 is recognized. For example, sabotage on cables or the device 340 itself is recognized and reported back to the central server 220, and it reduces the rate of a successful OTA update.

h) Cybersecurity attacks: Cybersecurity attacks on the central server 220 and/or the device 340, such as Distributed Denial of Service (DDOS) attacks, are recognized and reported. Cybersecurity attacks reduce the rate of a successful OTA update.

The OTA prediction module 300, utilizing the ML algorithm 312 performs and executes a method for a reliable OTA firmware update. More specifically, the OTA prediction module 300 provides a determination of a probability rate for a successful OTA update. Determination means to predict, forecast, or estimate a likelihood for a successful OTA update. Such a likelihood or probability rate may be represented in percentage (%) or other type of value, e.g. number or figure. If the probability rate is equal to or above a predetermined threshold, the OTA prediction module 300 is configured to deploy the update to the target device 340. Such a threshold may be for example at least 70% for the probability rate to proceed with the update. Of course, the threshold can be a different rate/value, for example adapted to local circumstances of the target device 340.

The ML algorithm 312 is configured to determine or calculate the probability rate based on the input sources 330 in combination with further specific parameters, limitations, or thresholds. The limitations or thresholds relate to the input information as described above, e.g. weather conditions, natural disasters, local temperature, electric grid fluctuations, network connectivity, maintenance activities, local sabotage, cybersecurity attacks, etc.

With respect to the implementation of the ML algorithm 312, the data collected from the different data sources 330, can be ranked or weighed with respect to an importance/impact for the firmware/software update. In this case, the ML algorithm 312 is trained and capable of ranking or weighing the data. For example, a cybersecurity attack may be ranked higher (with more weight) than weather information, wherein the different rankings contribute differently to the overall probability rate for a successful update. In another example, the different input data can be considered equally.

In an embodiment, the ML algorithm 312 trains and learns, for example unsupervised, using historic data, which events or characteristics contribute or do not contribute to a successful OTA update. For example, historic data may show that a specific weather event in Europe, negatively influenced an OTA update. Based on this input information, the ML algorithm 312 can learn and predict that an OTA update in another region, for example North America, is also not successful under the described weather situation.

Further, in another example, a decision making is distributed so that certain parameters, that are easy for the industrial device 340, e.g., electrical vehicle charger, to discover, affect when the device 340 asks for an OTA update, while other parameters that are only known to the server 220 determine whether the server 220 triggers the OTA update. For example, the device 340, e.g., electrical vehicle charger, can get its temperature or the weather forecast easily, it can also sense the local grid, and it may know whether it is under a cyber-attack (local or remote). But only the server may know if it is under a cyber-attack.

In another embodiment of the present disclosure, the OTA prediction module 300 comprises an algorithm configured to make decisions with respect to OTA firmware/software updates, wherein the algorithm is not ML-based, but instead comprises probabilistic thresholds that would allow or block performing an update based on a simpler multiplication of the probability of each of the parameters affecting the update (similar to a service level availability (SLA) calculation, in which if two sub-systems are 99% available and they are used together as a system, the combined SLA is 98%). Such an algorithm or method allows a quick decision without the need for training or inference, where blocker items, e.g., local sabotage or a cybersecurity attack, have a 0% threshold, and therefore block the OTA update at that point in time.

As illustrated in FIG. 2 and FIG. 3, the central server 220, the OTA prediction module 300 and the target devices 340 are configured to communicate with each other, i.e., exchange data, signals, and instructions. Specifically with respect to certain events, such as local temperature, electric grid fluctuations, network connectivity, maintenance activities, local sabotage, and/or cybersecurity attacks, the target device 340 is configured to recognize these events and/or record data relating to these events or circumstance and report back on these events to the central server 220. For example, the target device 340 may be designed to record local temperature directly at the device 340 and report back temperature data to the central server 220. In another example, the target device 340 may recognize a cybersecurity attack and report back this event/instance to the central server 220. The same can apply to network connectivity, maintenance, local sabotage etc.

In an embodiment, if the target device 340 already initiated a download of the firmware/software update and a disturbance is sensed or measured, e.g., temperature, humidity, voltage, altitude, etc., the device 340 is configured to halt or pause the download. If the download has already started and an issue is detected, the actual installation of the update can be delayed.

In another embodiment, if an OTA update is delayed for a prolonged period, for example over X (programmable) hours, a user is alerted so that a root cause can be identified and addressed. In such cases, the user is allowed to override and manually attempt a firmware update under adverse conditions.

Figure 4:
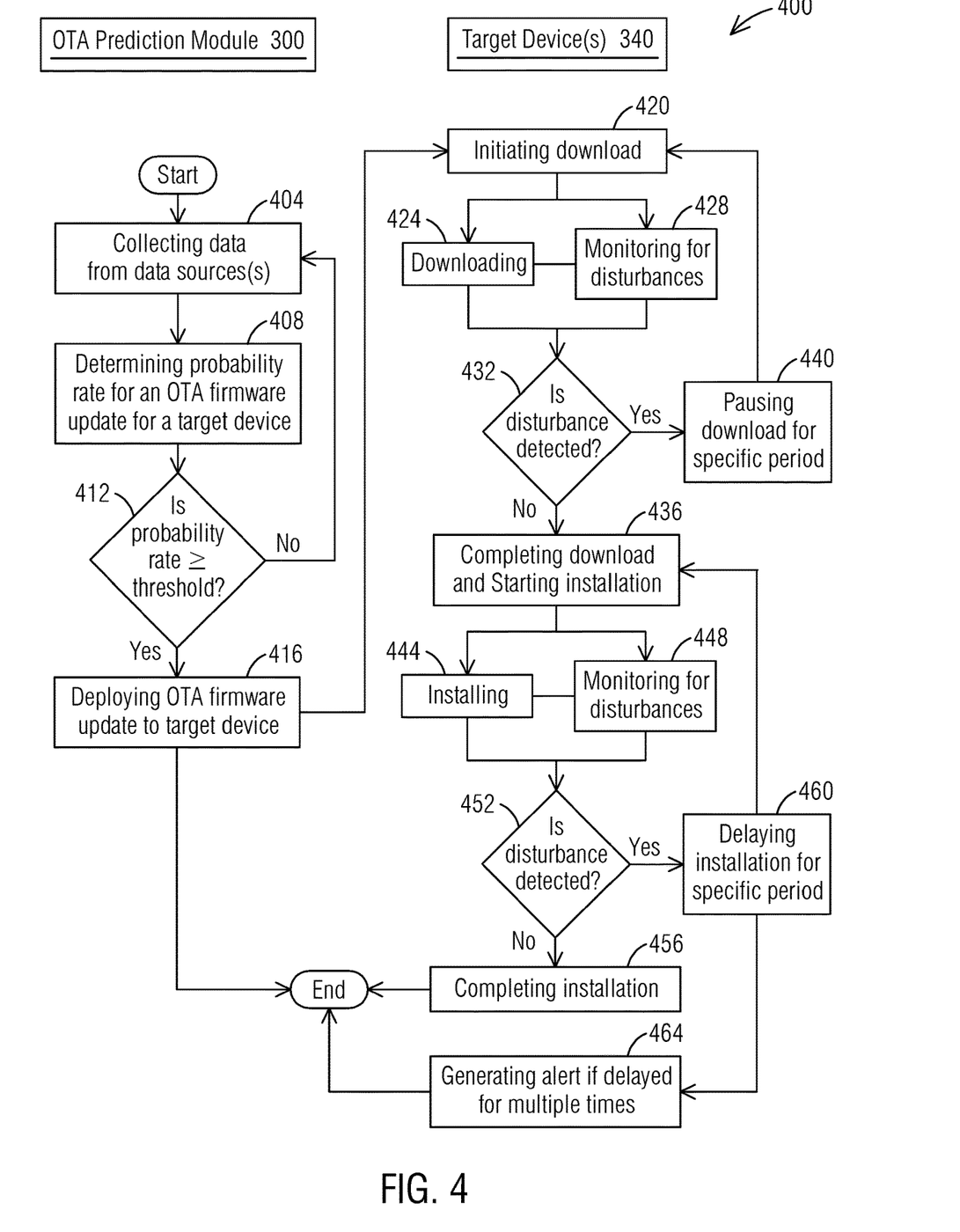
FIG. 4 illustrates a flow chart of a method for over-the-air (OTA) firmware update in accordance with an exemplary embodiment of the present disclosure.

FIG. 4 illustrates a schematic diagram of a method 400 for an over-the-air (OTA) firmware update in accordance with an exemplary embodiment of the present disclosure. While the method 400 is described as a series of acts or steps that are performed in a sequence, it is to be understood that the method 400 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 400 comprises, utilizing OTA prediction module 300 with processor 304 and memory 308, act 404 collecting data from a data source, preferably many data sources, act 408 determining a probability rate for an over-the-air (OTA) firmware update of at least one industrial device, e.g., target device 340, based on the data, and act 416 deploying the OTA firmware update to the at least one industrial device when the probability rate is equal to or above a predetermined threshold, as per decision 412.

It should be noted that the collection of data can be integrated into the OTA prediction module 300, e.g., performed by the prediction module 300, or can be separate process or module, located for example in the central server 220. The collection of data is performed recurrent in a scheduled manner, utilizing for example a scheduling mechanism. For example, data may be collected once a day or several times a day. In an example, the OTA prediction module 300 is incorporated into a central server 220, wherein the collecting, determining, and deploying is performed by the central server 220 with the integrated OTA prediction module 300.

As described in detail with reference to FIG. 3, the data sources comprise data relating to weather, environmental conditions, electric grid fluctuations, network connectivity, maintenance activity, local sabotage of the industrial devices, cyber security attacks on the central server and/or the industrial device, etc.

The method 400 further comprises, performed by the target device 340 (which is an industrial device 210, such as an electrical vehicle charger, as shown in FIG. 2), initiating an OTA download, act 420. Then, the target device 340 downloads the update (act 424) and, simultaneously, monitors for any disturbances that may affect the download (act 428). If no disturbance is detected, see decision 432, for example a network connectivity issue, the device 340 completes the download and starts installation of the update (act 436). On the other hand, if a disturbance is detected before, during or after the download of the update, the method 400 comprises pausing the download for specific period (act 440). A specific period can be a preprogrammed time, for example 24h, until another download attempt is initiated.

In response to a successful and complete download of the firmware update, the target device 340 installs the update (act 444) and, simultaneously, monitors for any disturbances that may affect the installation (act 448). The monitoring for disturbances can be periodic checks or continuous checking whether anything would negatively impact the installation. If no disturbance is detected (decision 452), the device 340 completes the installation of the update (act 456). On the other hand, if a disturbance is detected before or during the installation, the method comprises delaying the installation for specific period (act 460). A specific period can be a preprogrammed time, for example 24 h, until another attempt for the installation is made.

The method 400 further comprises generating an alert in response to a delayed firmware update over a prolonged period, for example if the installation has been delayed multiple times, see act 464. The alert can be generated by the target device 340 and/or by the central server 220 if the central server 220 is notified of such delays. The alert may then be transmitted or sent to a user for further evaluation and, if necessary, manual installation of the update.

As described with reference to FIG. 3, the collected data, stored for example in memory 308 or other type of data store, are received and processed by the OTA prediction module 300, utilizing ML model or algorithm 312, as described before. More specifically, the determining of the probability rate for an OTA firmware update (act 408) includes implementing the ML algorithm 312 based on the data source in combination with input parameters and/or limitations as described earlier.

It should be appreciated that the described method 400 may include additional acts and/or alternative acts corresponding to the features described previously with respect to the system 200 and evaluation module 300 (see FIG. 2 and FIG. 3).

Figure 5:
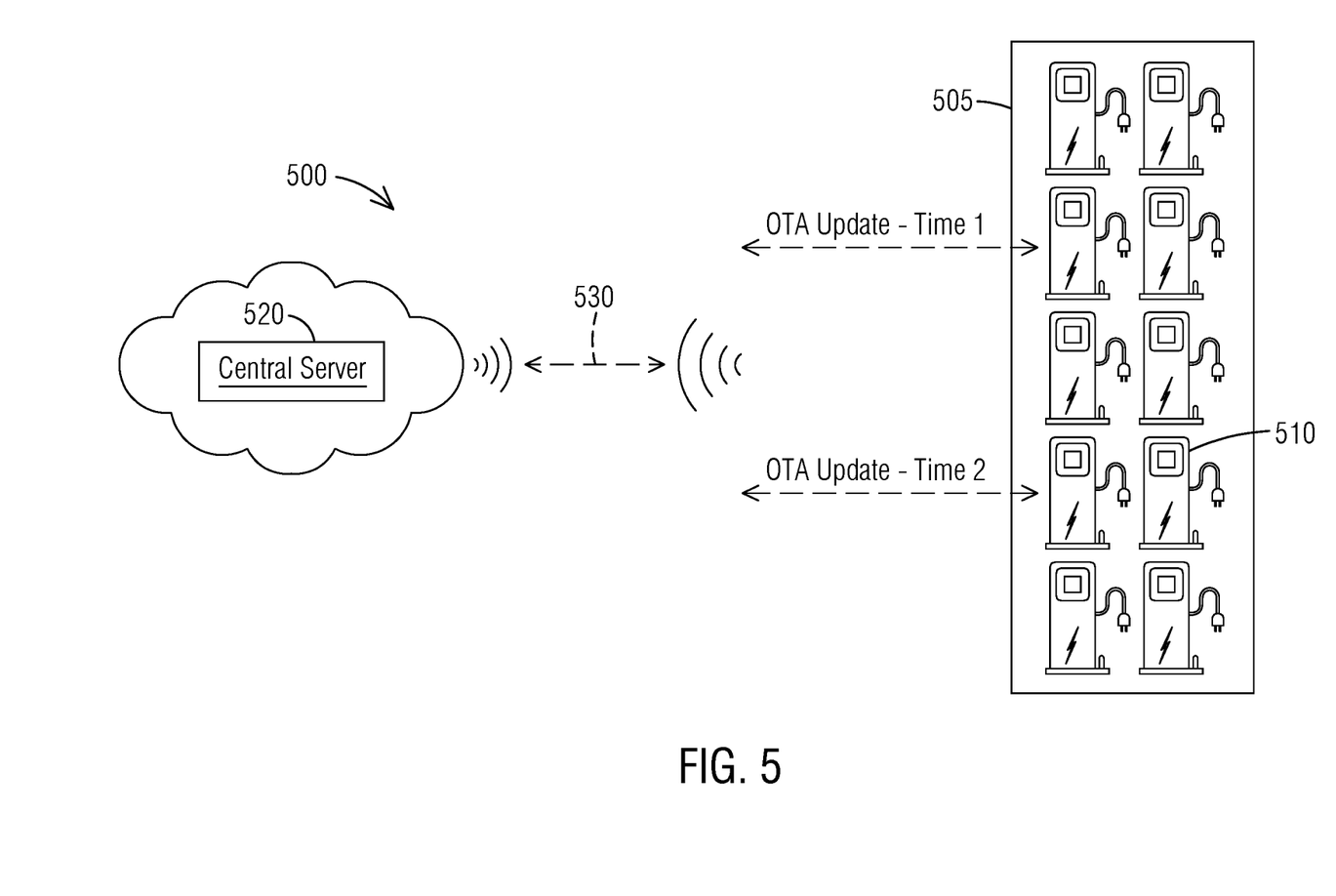
FIG. 5 illustrates a diagram of a system for reliable OTA firmware update in connection with a fleet of electrical vehicle charging devices in accordance with an exemplary embodiment of the present disclosure.

FIG. 5 illustrates a diagram of a system 500 for reliable OTA firmware update in connection with a fleet of electrical vehicle charging devices in accordance with an exemplary embodiment of the present disclosure.

In general, the system 500 corresponds to the system 200 described in connection with FIG. 2, but instead of communicating and updating firmware or software of a single industrial device, e.g., electrical vehicle charger 210, the system 500 illustrates communicating and updating a fleet 505 of industrial devices, e.g., a fleet of electrical vehicle chargers 510.

As described earlier, each industrial device, in our example chargers, 510 of the fleet 505 comprises firmware and software. The system 500 further comprises central server 520 and a wireless network 530, wherein the chargers 510 and the central server 520 are configured to communicate via the wireless network 530. The mobile connections 530 are secure connections that are encrypted by one or more security protocols to ensure security of the data flowing between the different systems.

The system 500 further comprises an OTA prediction module 300 configured via executable instructions to determine a probability rate for a successful OTA firmware update of the fleet 505 of industrial devices 510. The OTA prediction module 300 has been described in detail with reference to FIG. 3 and FIG. 4 and will not be described in connection with FIG. 5.

In an exemplary embodiment of the present disclosure, for each charging device 510, the central server 520 stores an address, such as IP or MAC address. When the chargers 510 have the same address, they are considered to be used together, for example for a same group of vehicles. Alternatively, the concept of a "location" or "site" in the server 520 can be manually configured by an administrator.

The central server 520 can be configured to measure a statistical utilization of the devices 510 in a site for charging every day, in daily average, or how many busy hours the site has compared to usable hours (not every hour in a day is usable, because vehicles spend a part of the day in missions away from the charging site). For example, a measured utilization is X %. The central server 520 can be configured to offer the latest firmware or software update only to a fraction of the devices 510 in a site, to guarantee that MIN % of the devices are available for charging, in case that the OTA firmware/software update fails and rolls these updates on a daily basis.

For example, let's assume that the site/fleet 505 has an average of 80% occupancy (which corresponds to eight chargers 510), and that an administrator of the fleet 505 only is comfortable with at most a 90% occupancy (nine chargers 510). In this case, the server 520 selects 90%−80%=10% of the chargers 510 to update on a daily basis. In our example, this means that one charger 510 at a time is updated. FIG. 5 illustrates that a first charger 510 is updated at Time 1, a second charger is updated at Time 2, and so on. In this scenario, a roll out of a new firmware/software to all the chargers 510 in this site takes 10 days (10% of the chargers every day).

Summarizing, the described systems 200, 300 and 500, and method 400 incorporate local grid, climate, hacking, and natural conditions to optimize OTA updates. By taking these factors into account, a risk of update failures is reduced, and unnecessary data usage minimized, resulting in a more reliable and efficient update process.

It should be appreciated that acts associated with the above-described methodologies, features, and functions (other than any described manual acts) may be carried out by one or more data processing systems, such as for example OTA prediction module 300, via operation of at least one processor 304. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discussed previously, the module 300 and/or processor 304 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the module 300/processor 304 with the executable instructions (e.g., software/firmware apps) loaded/installed into a memory (volatile and/or non-volatile), which are currently being executed and/or are available to be executed by the processor 304 to cause the processor 304 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

Further, it should be understood, that reference to "a processor" may include multiple physical processors or cores that are configured to carry out the functions described herein.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++, Scala, R, MATLAB, Clojure, Lua, Go or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A computer-implemented method for an over-the-air (OTA) firmware update for a fleet of electric vehicle charging devices, the method comprising:
    collecting data from a data source,
    determining a probability rate for an over-the-air (OTA) firmware update of an electric vehicle charging device based on the data, and
    deploying the OTA firmware update to the electric vehicle charging device when the probability rate is equal to or above a predetermined threshold,
    wherein, for a fleet of electric vehicle charging devices in a site, a statistical utilization of the devices is measured,
    wherein, based on the statistical utilization, the OTA firmware update is offered to a fraction of the fleet of electric vehicle charging devices in the site to guarantee that a certain amount of electric vehicle charging devices are available for charging in case that the OTA firmware update fails.

2. The method of claim 1,
    wherein the collecting, determining, and deploying is performed by an OTA prediction module implemented in a central server, or in the electric vehicle charging device, or in a distributed manner in the central server and the electric vehicle charging device.

3. The method of claim 1, further comprising:
    initiating an OTA download and executing an installation of the firmware update by the electric vehicle charging device.

4. The method of claim 1, further comprising:
by the electric vehicle charging device:
- detecting a disturbance before, during or after a download or an installation of the firmware update, and, in response to a detected disturbance, pausing the download of the firmware update in response to the disturbance or delaying installation of the firmware update.

5. The method of claim 4, further comprising:
generating an alert in response to a delayed firmware update over a prolonged period.

6. The method of claim 1,
wherein the collecting comprises collecting data via multiple application programming interfaces (APIs), and
wherein the multiple APIs are configured to provide data recurrently in a scheduled manner utilizing a scheduling mechanism.

7. The method of claim 1,
wherein the multiple data sources comprise data relating to weather, environmental conditions, electric grid fluctuations, network connectivity, maintenance activity, local sabotage of the industrial devices, cyber security attacks on the central server and/or the electric vehicle charging device.

8. The method of claim 1,
wherein the determining the probability rate for the OTA firmware update comprising implementing a machine learning (ML) algorithm based on the data source in combination with input parameters and/or limitations.

9. A non-transitory computer readable medium encoded with processor executable instructions that when executed by at least one processor, cause the at least one processor to carry out a method for an over-the-air (OTA) firmware update as claimed in claim 1.

* * * * *